Sept. 4, 1934.　　　　　F. W. HOBAN　　　　　1,972,097
ART OF TESTING COINS OR OTHER TOKENS FOR GENUINENESS
Filed Feb. 20, 1931　　　3 Sheets-Sheet 1
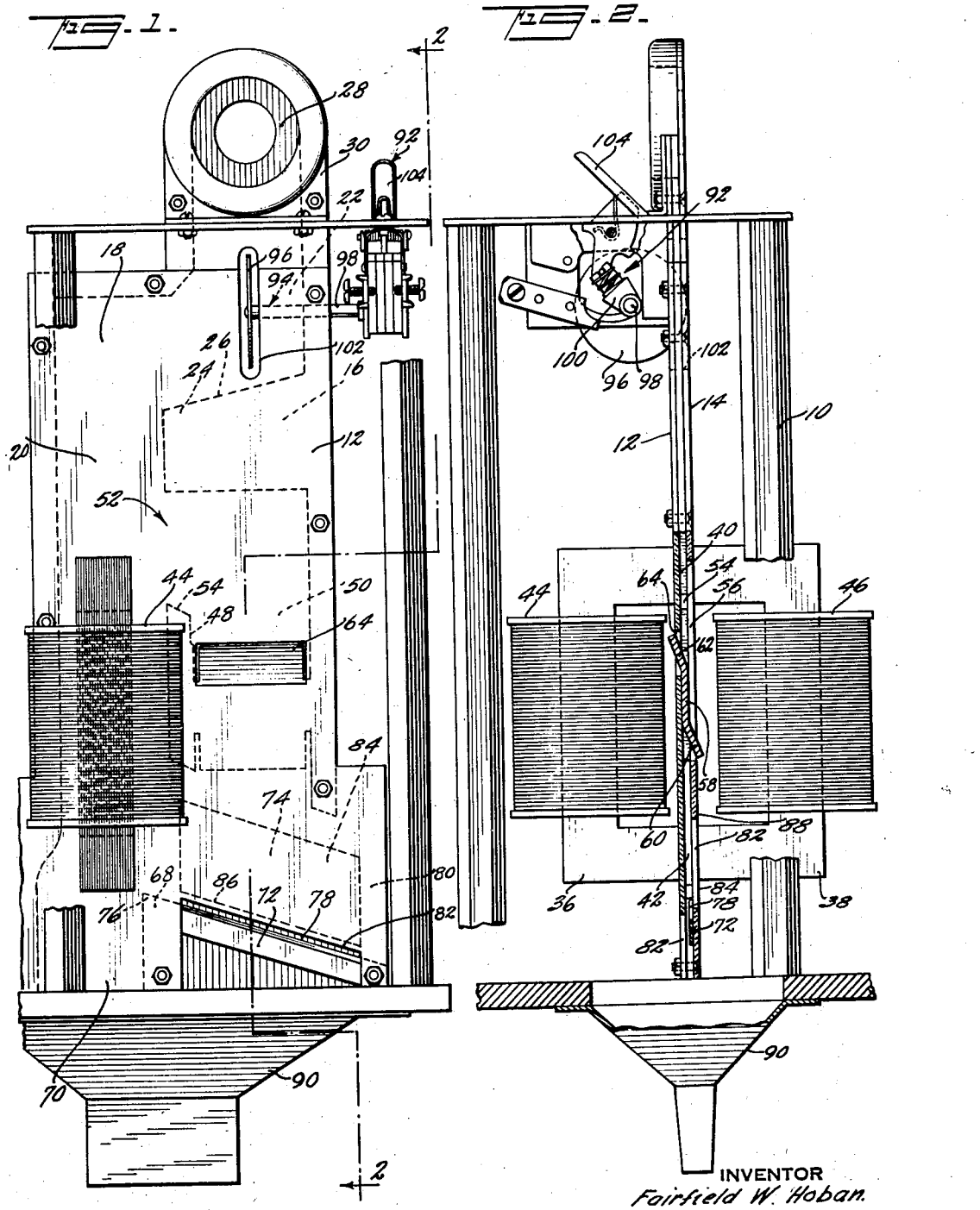
INVENTOR
Fairfield W. Hoban.
BY
Dyke and Schaines
ATTORNEYS

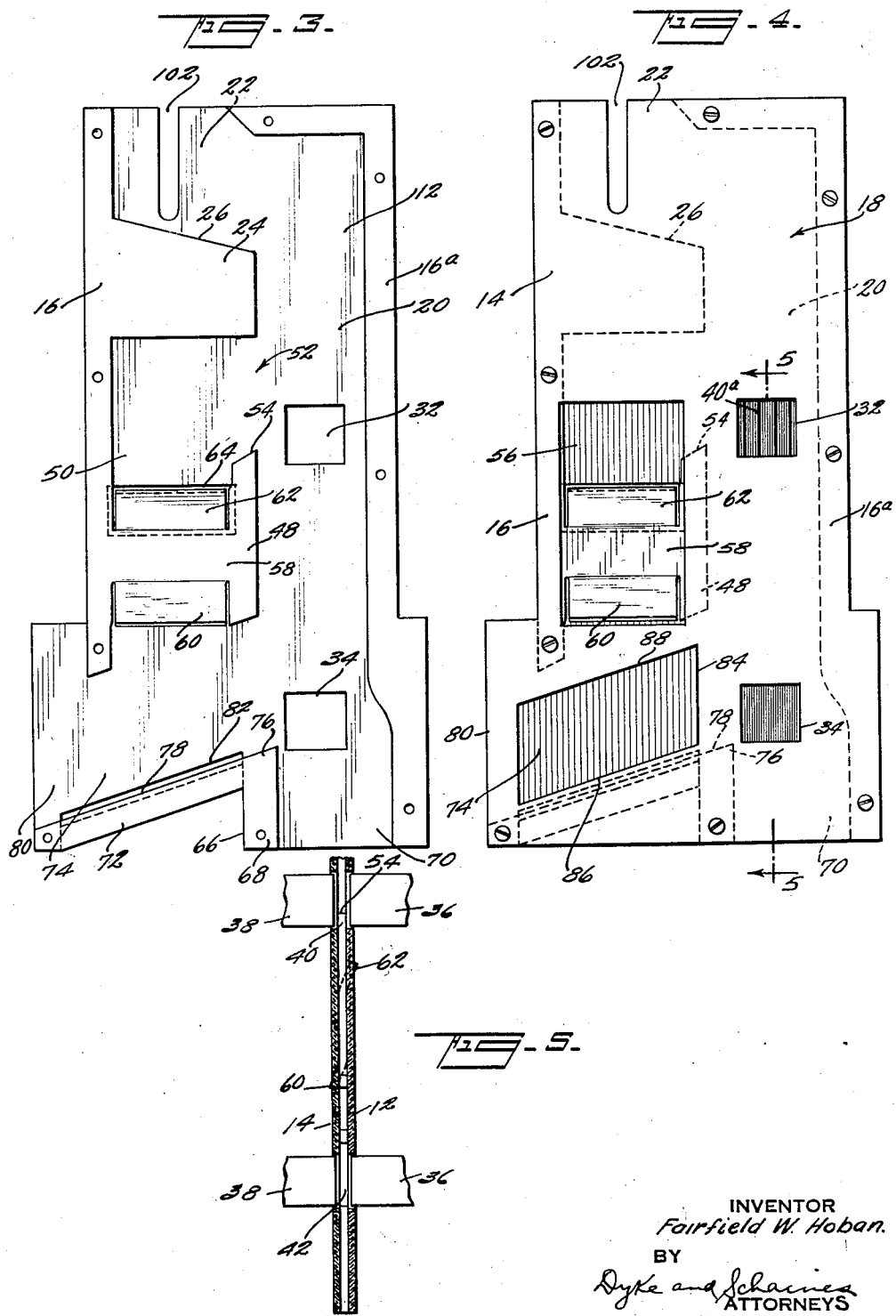

Sept. 4, 1934.  F. W. HOBAN  1,972,097
ART OF TESTING COINS OR OTHER TOKENS FOR GENUINENESS
Filed Feb. 20, 1931  3 Sheets-Sheet 3
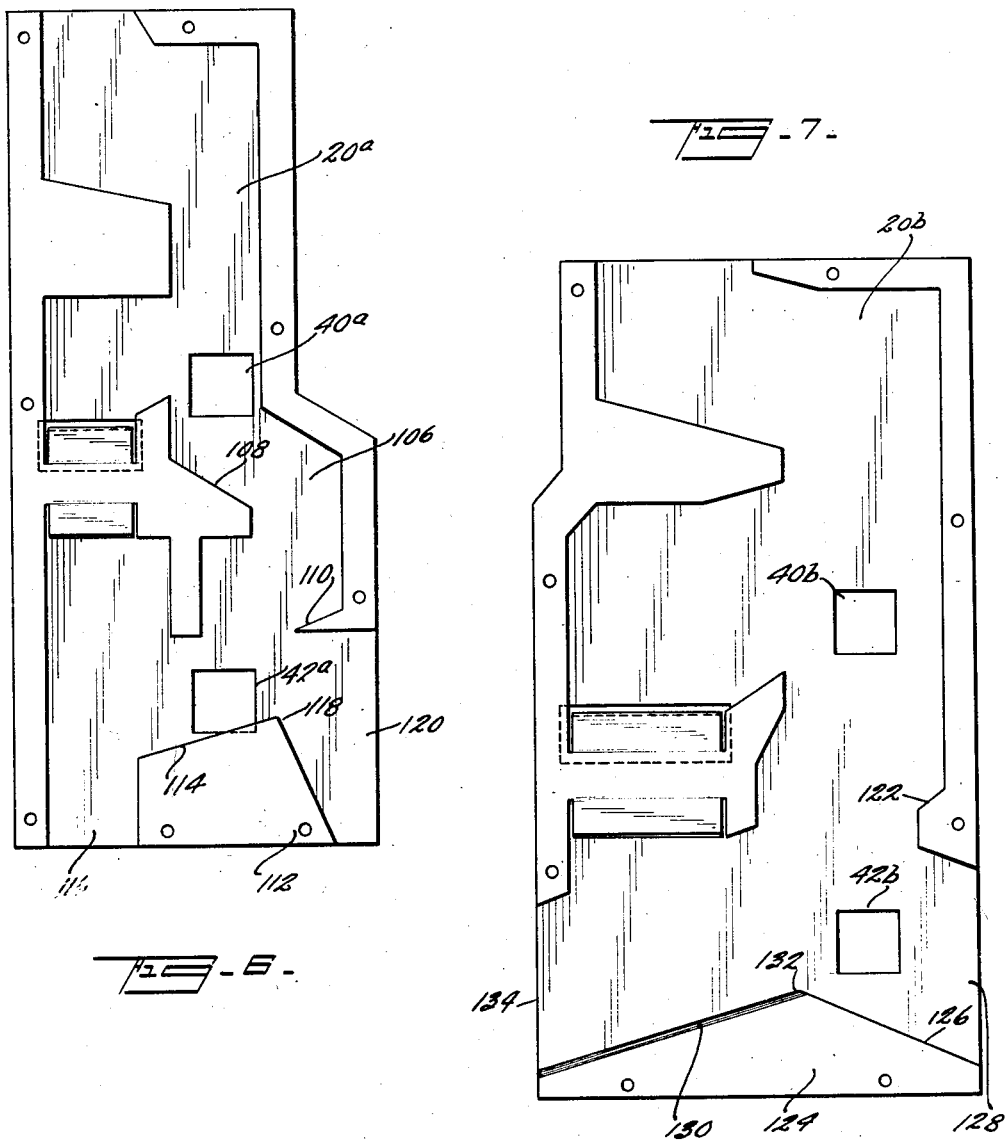
INVENTOR
Fairfield W. Hoban.
BY
Dyke and Schaines
ATTORNEYS Patented Sept. 4, 1934

1,972,097

UNITED STATES PATENT OFFICE 1,972,097

ART OF TESTING COINS OR OTHER TOKENS FOR GENUINENESS

Fairfield W. Hoban, New York, N. Y., assignor to Fairfield Specialties Corporation, New York, N. Y., a corporation of New York Application February 20, 1931, Serial No. 517,222

25 Claims. (Cl. 194—101)

My invention relates to improvements in means and methods for testing coins, tokens or like devices for genuineness, and for retaining or accepting the genuine pieces and devices and refusing or rejecting the spurious or counterfeit ones.

An object of the invention is to effect the elimination of the spurious devices and the acceptance of the genuine ones primarily by the action thereon of electrical forces serving to direct the devices into their respective channels for elimination or acceptance without resorting to or relying upon the use of moving parts.

Another object of the invention is to effectively distinguish between spurious and genuine devices which differ in electrical properties, such as resistance, but slightly from each other.

Another object of the invention is to effect the elimination of spurious devices of substantially all known metallic materials or compositions and the acceptance of silver alloy coins or devices by subjecting the same to an alternating or pulsating electromagnetic field or fields.

Another object of the invention is to control the velocities of the various coins or devices as they pass towards or through one or more of the various electromagnetic fields so that the fields, as adjusted, will be capable of effecting the elimination of the spurious device and the acceptance of the genuine.

Another object of the invention is to render said fields substantially immune to voltage variations in the line.

Another object of the invention is to subject certain of the devices passing the electrical test as genuine because of their thinness or other defect in size to a dimensional test or other action in order to eliminate the same.

Other objects will in part be obvious and in part be pointed out hereinafter.

To the attainment of the aforesaid objects and ends, my invention consists of the novel features of construction, and in the combination, connection and arrangement of parts, and in the steps constituting my method, hereinafter more fully described and then pointed out in the claims.

In the accompanying drawings:

Figure 1 is front elevation of one form of device constructed according to and embodying my said invention;

Fig. 2 is a side elevation thereof in section on the line 2—2 of Fig. 1;

Fig. 3 is an elevation of the inner side of one of the insulating chute forming panels;

Fig. 4 is a rear elevation of the chute with one coil and core omitted;

Fig. 5 is a section thereof on the line 5—5 of Fig. 4;

Fig. 6 is an elevation of the inner side of a chute forming panel adapted for use with dimes; and Fig. 7 is a similar view of the inner side of a chute forming panel adapted for use with half dollars.

The present invention is particularly adapted for detecting or accepting silver alloy coins, such as dimes, quarters, half dollars and dollars and rejecting their corresponding counterfeits of other materials or baser metals. The detection of the devices or their distinguishment is accomplished by causing the devices to drop or pass by gravity through a chute, or chutes subject to the effects of alternating or pulsating magnetic fields utilizing either an alternating current or a direct current with an interrupter.

Coins, devices or tokens of metallic composition moving through an alternating or pulsating electromagnetic field develop therein what is known, or herein termed, as eddy currents which vary in strength substantially in accordance with the electrical properties of the metal as in the case of ordinary conductors. These eddy currents and the electromagnetic field react on each other to retard or even prevent the passage of the coin or device through the field. Devices of low resistance are retarded more than those of equal size having a higher resistance. Devices of like composition having equal diameters are retarded directly in proportion to their thicknesses. The retarding effect also increases with the mass of material or area exposed to the flux or field. And again, other things being equal, coins or devices of large diameter are retarded more than devices of lesser diameter because they are exposed to the field for a longer time in passing through the same.

Devices dropping or moving through the chute possess kinetic energy which is a function of the mass and velocity ($\frac{1}{2}MV^2$) the mechanical force thus developed tending to overcome, or overcoming, the opposing electrical force due to eddy current effect. It is therefore necessary to control, adjust or coordinate these opposing forces so that the numerous slugs or spurious devices of diversified compositions, weights, and dimensions can be readily detected and eliminated while acceptance of the genuine device or coin is insured.

My method broadly consists in subjecting the genuine device or silver alloy coin to the action of a series of alternating or pulsating electro-magnetic fields of different strengths acting successively, the first field being adjusted in intensity to eliminate the slugs of certain compositions, and the second field being adjusted in intensity to eliminate the slugs of other compositions. The elimination can be effected, by adjusting the strength of the first field to prevent passage therethrough of the silver coin and slugs of high conductivity, such as copper and aluminum slugs, the field being disposed to cause the highly conductive devices to be deflected laterally in the direction of the second field located below and in offset relation to the first field. The second field is then adjusted in strength to deflect laterally the copper and aluminum slugs and allow the silver coin to pass therethrough. Slugs which are relatively inert to eddy current effect, such as brass, zinc, tin, and lead, pass through the first field and out. Iron slugs are held magnetically by the first field and drop out through the vertical path when the current is shut off.

In the preferred method however for effecting the elimination of slugs or spurious devices, the upper or first field is adjusted in strength to laterally deflect the copper and aluminum slugs to eject the same, the silver coin and remaining slugs of other metals passing through the first field. The second field is adjusted to laterally deflect the silver coin, allowing the slugs to pass therethrough.

Referring to the drawings, the device or devices illustrated are for carrying out the preferred method, Figs. 1 to 5 representing, as one example of the invention, a device for silver quarters. The device comprises a support 10 having a pair of plates or panels 12 and 14 of insulating material disposed vertically therein and secured together in spaced relation with the metallic separators 16 and 16a therebetween, the separators being arranged to form a chute or passage 18. The chute 18 comprises a vertical portion 20 at one side of and substantially coextensive in length with the panels 12 and 14, and an angularly arranged entrance portion 22 communicating with the passage 20 at the upper end thereof and formed by extending the separator 16 inwardly as indicated at 24, the upper edge 26 of the portion 24 being inclined downwardly towards passage 20 and serving as means for equalizing the velocities of the devices inserted.

The coin or device is inserted through an opening 28 of a coin receiving member 30 having a passage portion communicating with the passage portion 22 above the incline 26. The opening 28 is preferably of the size required to receive a coin of the desired denomination and to prevent the insertion of larger devices or coins.

The panels 12 and 14 are provided with aligned openings 32 therein into the passage 20 at a point immediately below the portion 24 as shown, and with aligned openings 34 therein below the openings 32 at the lower portion of the passage 20.

A pair of U-shaped laminated silicon cores 36 and 38 are secured to the outer sides of the panels 12 and 14 with the ends of each core aligned with the openings 32 and 34, the cores jointly forming upper and lower gaps 40 and 42 sufficiently wide to allow the free passage of the devices therethrough, and located in offset relation to the center of the chute 20 at the side thereof towards the separator 16a.

The intermediate portions of the cores are surrounded by the coils 44 and 46, preferably connected in parallel, in circuit with a source of alternating or intermittent current, two coils giving better results although one coil of correspondingly larger size may be employed.

The intensity or strength of the electromagnetic fields at the gaps 40 and 42 is determined by the amount of iron present in the core portions at the opposite sides of the gaps, the area of the core ends and the width of the gaps. The field at the gap 40 is adjusted so that the number of lines of force traversing the gap is sufficient to prevent the passage of copper and aluminum slugs therethrough and to throw or deflect the same laterally out of the passage 20 as hereinafter described, while allowing the passage of the silver coin and slugs of other compositions therethrough. The field at the gap 42 is adjusted to have sufficient lines of force to prevent the passage of the silver coin therethrough and to deflect the same laterally. The lower field at 42 is somewhat stronger than the upper field at 40. In the present invention the same coils or coil serve to develop the electromagnetic flux for both gaps, cores 36 and 38 forming a single magnetic circuit. This arrangement reduces the cost of the device and allows the gaps 40 and 42 to be placed in vertical alignment with each other. The fields at 40 and 42 are saturated at the lowest voltage in the line so that fluctuations or increases in line voltage will not cause variation in the field intensity. The core areas at the gaps being equal, the lines of force traversing the gap 40 are preferably reduced by reducing the number of metal laminations in the core ends at the gap 40, the metallic laminations being replaced by laminations 40a of insulating material as shown at Fig. 4. In my invention the coin or device is subjected to substantially equal forces at both sides so that there is no tendency for the coin or device to be displaced in a direction at right angles to the plane thereof to cause sticking or jamming against the chute walls, the eddy current effect tending to move the coin or device edgewise, transversely of its vertical path of travel. By providing core portions at both sides of the coin or device, the lines of force being thereby concentrated at the gaps, more power is available for laterally deflecting the devices. It is preferable to have the flux density of the field at 40 slightly less than that required to prevent the passage of the silver coin through the gap, the field then being strong enough to throw out the copper and aluminum. The lower field 42, although preferably saturated, need not be as critically adjusted as the upper field, the lower field being made strong enough to deflect the good coin at the lowest line voltage encountered. With this adjustment, slugs such as lead, zinc, tin, brass, etc., readily pass through the gap 42 because they are relatively inert to eddy current effect. Iron slugs lock at the first gap and pass out when the coils are deenergized.

The inner edge of the passage 20 contiguous to the gap 40 is formed by a separator portion 48, preferably integral with the member 16, having the vertical edge thereof substantially in alignment with the vertical edge of the portion 24, the two portions being spaced to form therebetween a lateral passage 50 having an entrance 52 from the passage 20. The upper edge 54 of the portion 48 inclines downwardly away from the gap 40, and forms a projection at a level slightly above the base of the gap 40. Devices, such as those of copper and aluminum entering the gap or field 40, are subjected at the side thereof remote from the projection 54 to the major action of the magnetic flux which causes the device to be deflected towards and forced over the incline or projection 54 into the passage 50 where they drop down and are deflected out through an opening 56 in the panel 14. For this purpose the lower portion of the passage 50 is provided with a deflecting means 58, preferably formed integrally with and between the portion 48 and outer portion of the separator 16. The deflecting means 58 comprises an outwardly directed lower portion 60 extending beyond the lower edge of the opening 56 and an oppositely directed upper portion 62 projecting through an opening 64 in the panel 12. With this construction devices in being ejected through opening 56 will not strike projecting edges, and the opening 56 is sufficiently elongated to prevent the device from binding or wedging between the panels when the device is angularly displaced by the deflecting means 58.

The passage 20 at the inner side thereof contiguous to the lower gap 42, is defined or formed by an angular separator 66 having a vertical portion 68 forming the outlet portion 70 of the passage 20 below gap 42 and a laterally extending and downwardly inclined portion 72 forming a lateral passage 74 from the gap 42 into which the good coin is deflected by the field. The corner of the separator 66 forms a projection 76 located on a level slightly above the base of the gap and laterally thereof. The good coin is subjected to the action of the field 42 at the side remote from the projection 76 and is deflected or forced thereover, to roll through the passage 74 on the upper edge 78 of the separator 66, the coin being discharged through opening 80 for acceptance.

It may happen that the copper or aluminum slug is so thin that the eddy current effect developed at gap 40 is insufficient to force the slug into the passage 50 for ejection or return, even though its kinetic energy is then less. In such event the slug will pass like a good coin into operative relation to the lower gap 42 where it will be deflected into the good coin discharge passage 74. I therefore provide means for preventing the discharge of such thin devices or undersize devices through the outlet 80 as if it were a good coin of acceptable dimensions.

For this purpose, the lower portion of the panel 12 is cut away to form an opening as indicated at 82 along a line slightly above and parallel with the edge 78, which edge is beveled on the side of the opening 82. The panel 14 is also provided with an opening 84 having a lower edge 86 substantially parallel with but slightly above the edge 78 and having a vertical dimension which is substantially less than the diameter of the good coin so that the upper portion of the coin as it rolls along the edge 78 will engage the portions 88 of the panel and not drop out. Coins of the proper thickness will thus roll through passage 74 on the beveled edge and be discharged through opening 80. Thin devices or coins, however, will slip off of the beveled edge through opening 82 and drop out, the opening 84 allowing such thin device to tilt without binding or jamming between the panels. The spurious devices ejected through openings 56, 70 and 82 drop into a common hopper 90 to be returned or otherwise disposed of.

The current through the coils 44 and 46 is controlled by a snap switch 92 operated by hand and held closed until the test is accomplished, although other types of switches, manual or automatic may be employed. I also provide means 94 for preventing the coin or device from dropping through the apparatus until the circuit is closed.

This means comprises a disk 96 secured to a shaft 98 carried by the movable snap contact 100 of the switch. The disk 96 normally extends into a slot 102 and obstructs the passage 22. When the switch is closed the disk 96 frees the passage 22 to allow the coin or device to drop. The switch is slow acting, the contacts not disengaging until the actuating lever 104 nearly reaches raised position, so that it is impossible to open the circuit before the device or coin passes the first gap, thereby rendering ineffective surreptitious or unlawful manipulation of the device, such as quick opening and closing of the switch, to prevent diverting of copper and aluminum slugs into the passage 50.

The principles of the invention, methods, and general arrangement of structure are the same for all silver coins of the United States or foreign countries, for example, quarters, dimes, half dollars, and dollars. In the case of coins of the size of the dime, half dollar, and dollar it is necessary because of the length of drop between the first and second gaps to interpose mechanical means between the first gap and the second gap, or at the second gap, or both, for neutralizing the kinetic energy or momentum of the devices so that the electromagnetic field available may be rendered effective to deflect or force the good coin from the vertical path of travel. In the case of the dime, its diameter, thickness and mass is considerably less than that of a quarter, and hence the eddy effect developed therein is considerably less, and although its kinetic energy would be less because of its reduced mass, yet, even then, the kinetic effect is greater compared to the eddy current effect. While it is possible to shorten the width of the electromagnetic gaps for a dime and thus increase the field intensity somewhat yet this is not enough. Nor is it practical to increase the area of the core ends because the flux must be applied at one side of the coin or offcenter so that the lateral forcing over or deflection of the device may be effected. Since the cores are saturated at the gaps, increases in current strength would have no effect in increasing the field strength. The size of the half dollar is so much greater than the portion thereof under induction that its kinetic energy is more effective than the eddy current effect and must be neutralized, at least in part.

Referring to Fig. 6, I have illustrated a panel having separators or chute forming members thereon arranged to form a passage or passages adapted for a dime, the remaining parts of the apparatus employed not being shown, such parts being like those above described and disclosed at Figs. 1 to 5. In this arrangement the passage portion 20a below the upper gap 40a is formed as a zigzag channel 106. The dime passing gap 40a rolls down the incline 108 and drops upon incline 110 from which it drops towards the gap 42a. This kind of coin travel tends to reduce its momentum so that the field becomes more effective thereon in throwing or forcing the device out. Below the lower gap 42a is a spacer or separator 112 having an upper edge 114 inclined downwardly towards the spurious device outlet 116 and terminating in a corner or projection 118 at the opposite side of the gap a little above the base thereof. The dime is thus supported by the incline 114 between the projection 118 and the gap 42a so that the dime when forced over the projection 118 through opening 120 by the field is substantially devoid of kinetic energy or momentum. The inert spurious devices reaching field 42a merely roll down the incline 114 and out without being appreciably affected by the field.

Referring to Fig. 7, the passage 20b is of a width for passing a half dollar, and is formed by spacers or separators, similar in arrangement and function to the arrangement described above in connection with Figs. 1 to 5, the electromagnetic device and complementary panel employed therewith not being shown. The half dollar passing gap 40b engages an inclined projection 122 which slightly retards its momentum. Below the gap 42b is a spacer or separator 124 having an inclined edge 126 below the gap leading to a spurious device outlet 128, and an oppositely inclined edge 130, which may be beveled to cooperate with the portions forming means for ejecting spurious devices which are thin, as described in connection with Figs. 1 to 5. The inclined portions form an apex or projection 132 at the side of the field 42b opposite the outlet 128 and slightly below the gap 42b. The movement of the good half dollar is arrested by engagement with the inclined portion 126. The apex 132 and field 42a, as in the case of the apex 118 and field 42a in the dime apparatus, in effect, form a saddle or V for supporting the good coin. The field 42b is thus able to force the half dollar now substantially devoid of momentum over apex 132 and out through the good coin outlet 134. Spurious devices which are relatively inert to eddy current effect roll down incline 126, the apex 132 being offcenter relative thereto to prevent passage of such spurious devices through outlet 134.

The diameter and thickness of the half dollar being greater than that of a dime cause the development of a relatively greater eddy current effect to oppose the corresponding greater weight or momentum of the half dollar, the half dollar remaining longer in the field because of its diameter. In the case of the dime therefore more mechanical neutralization of the kinetic energy thereof is necessary to render the available field effective in deflecting the coin. In any event the structures shown at Figs. 6 and 7 sufficiently retard the momentum of the coins to allow their deflection.

In operation, the coin or device is inserted through opening 28 and the switch 92 depressed. This releases the device or coin. Each device falls with substantially the same velocity because of the incline 24 towards the first gap. If the device is a genuine silver coin or a slug or a spurious device relatively inert to eddy current effect, such as lead, tin, zinc, and alloys of copper or aluminum, or non-metallic substances, it falls through the first gap without being affected thereby to the second gap which is adjusted to deflect or force out laterally the silver coin and to allow the others to pass therethrough to be returned. If the device inserted is of soft copper or aluminum the first field deflects the same into the passage 50 to be returned through opening 56. Magnetic slugs such is iron or nickel lock at the first gap and are returned when the circuit is deenergized. Spurious devices reacting because of thinness like a genuine device are returned through the dimensional slot 82.

Good coins or tokens passing out through the outlet therefor may be received into a suitable container, or diverted for actuating other devices, such as a bell or other regulating or indicating devices, or mechanism to be controlled by the coins, such as telephone pay boxes, turnstiles, vending machines, money changers, or the like, with which mechanisms the detecting means embodying the present invention may be incorporated.

In my invention, the elimination of detection of spurious devices is accomplished electrically within a limited space without undue complexity in the number of tests imposed and without requiring the use of moving parts for diverting the coins or devices into their proper channels. The invention is universal in its application and adaptability for refusing or eliminating slugs of all known metals, alloys, and of course non-metallic slugs of glass, fibre or the like.

In my invention, the devices tested fall by gravity through chutes or channels simple in arrangement, and the entire control of the disposition of the devices is accomplished by adjusting and controlling the momentum or kinetic energy of the devices and the electromagnetic fields available, and coordinating the same, so that effective distinguishment between the spurious and genuine devices is obtained, particularly between devices which approximate each other in electrical properties, such as copper and silver.

The electromagnetic fields as adjusted are immune to voltage fluctuations in the line so as not to render the device faulty or unreliable in operation, and ample power is available to deflect the coins or devices as required without causing sticking or jamming thereof in the chutes or passages.

Having described my invention, what I claim and desire to secure by Letters Patent is:

1. The hereindescribed method of distinguishing between genuine and spurious coins, tokens or like devices which consists in passing the devices into an alternating magnetic field of a strength sufficient to prevent the passage of certain devices therethrough and to allow the passage of devices of less responsiveness, said field being applied to the device at opposite sides and in offset relation to the center thereof to deflect the devices of greater responsiveness edgewise out of the path of travel thereof.

2. The hereindescribed method of distinguishing between genuine and spurious coins, tokens or like devices which consists in subjecting a device at opposite sides to a fluctuating magnetic field acting on the device predominately at one side of the vertical diameter thereof with sufficient force to repel certain of the devices edgewise laterally relative to the direction of travel thereof.

3. The hereindescribed method of distinguishing between genuine and spurious coins, tokens or like devices which consists in subjecting a device to a fluctuating magnetic field acting at opposite sides of the devices to deflect devices more responsive to eddy current effect than the genuine over a path to be eliminated and to pass the others, and subjecting devices passing the first field to a second fluctuating magnetic field acting at opposite sides of the devices to deflect the genuine device and pass the others over a different path to be eliminated.

4. The hereindescribed method of distinguishing between genuine and spurious coins, tokens or like devices which consists in causing a device to fall by gravity towards and in slightly offset relation to a fluctuating magnetic field, and causing said field, by reaction on a lateral portion of the device, to deflect certain of the devices presented edgewise laterally relative to the path of travel thereof.

5. The hereindescribed method of distinguishing between genuine and spurious coins, tokens or like devices which consists in causing a device to fall vertically a predetermined distance to a fluctuating magnetic field acting on opposite sides of the device to prevent displacement of the device transversely of the plane thereof, and having a strength coordinated with the distance of drop or momentum of the device to pass certain of the devices vertically therethrough and prevent by repulsion due to eddy current effect passage of other of the devices therethrough, said field being applied to the devices in offset relation to the center thereof to deflect the devices of greater responsiveness to eddy current effect edgewise laterally from the vertical path of travel thereof.

6. The hereindescribed method of separating metallic devices of various compositions from each other which consists in causing the device to fall vertically into a fluctuating magnetic field acting on opposite sides of the device to prevent displacement of the device transversely of the plane thereof, and more effective on one lateral portion of the device than on the other for causing the device to be repelled edgewise laterally relative to the direction of travel thereof into another path.

7. The hereindescribed method of distinguishing between genuine and spurious coins, tokens or like devices which consists in allowing the device to fall by gravity through vertically aligned fluctuating magnetic fields, the first field having a strength for deflecting into another path devices of greater responsiveness to eddy current effect than the genuine and to pass the genuine and other devices and the lower field having a strength for deflecting into another path the genuine device while allowing devices of lesser responsiveness to eddy current effect to pass therethrough.

8. The hereindescribed method of distinguishing between genuine and spurious coins, tokens or like devices which consists in causing the device to drop vertically into operative relation to fluctuating magnetic fields, one field being made to deflect spurious devices having more responsiveness to eddy current effect than the genuine, and to pass the genuine, and the other field being made to deflect the genuine and pass devices less responsive to eddy current effect, and said fields reacting on the device at opposite sides, more on one lateral portion than on the other, so that the devices upon deflection thereof are repelled edgewise laterally out of the path of travel thereof.

9. The method in accordance with claim 8 in which the genuine device passes vertically through the first field and is deflected by the second field.

10. The hereindescribed method of distinguishing between genuine and spurious coins, tokens or like devices which consists in passing the device vertically into a fluctuating magnetic field acting at opposite sides thereof, more on one lateral portion than on the other, and adjusted in strength to deflect certain devices presented thereto edgewise laterally into another path and to pass other devices, and passing devices following the path of the genuine vertically into a fluctuating magnetic field adjusted in strength and acting eccentrically on the device to deflect certain devices edgewise laterally into another path, and to pass others therethrough and effecting thereby the separation of the genuine device from others.

11. The hereindescribed method of distinguishing between genuine and spurious coins, tokens or like devices which consists in causing a device to fall towards fluctuating magnetic fields, and causing the first field to react thereon eccentrically to deflect devices more responsive to eddy current effect than the genuine edgewise laterally out of the path of travel to be eliminated, and to pass therethrough other devices, retarding the velocity of the devices passing through the first field towards the second field, and causing the second field to react eccentrically thereon to deflect the same, if genuine, while being held against substantial vertical movement, edgewise laterally out of the path of travel, and to pass the same, if spurious, into another path.

12. An apparatus of the character described comprising a chute, and a fluctuating current electromagnetic means having core portions forming a gap receiving said chute and traversed by a fluctuating magnetic field, said core portions being disposed in eccentric relation to the direction of travel of the device passing through said chute to cause the eddy current effect to deflect certain of the devices edgewise laterally relative to the direction of movement thereof, and an outlet in the chute for the deflected device.

13. An apparatus of the character described comprising a chute, electromagnetic means having a core portion forming a fluctuating magnetic field in operative relation to said chute, said core portion being adjusted to allow certain devices to pass through said field and prevent by eddy current effect devices of greater responsiveness to eddy current effect from passing therethrough, and being saturated for a relatively low voltage in the line to render the field immune to line voltage variations.

14. An apparatus of the character described comprising a vertical chute, means for controlling the velocities of coins or devices passing through said chute, fluctuating current electromagnetic means having separated core portions forming a gap receiving said chute and traversed by a fluctuating magnetic field, said gap being disposed eccentrically relative to the direction of travel of the coin or device to deflect certain of the devices edgewise laterally relative to the direction of travel thereof.

15. An apparatus of the character described comprising a vertical chute, fluctuating current electromagnetic means having separated core portions at different elevations forming fluctuating gaps receiving said chute and disposed in eccentric relation to the devices to be presented thereto, one gap being adjusted to deflect edgewise laterally of the direction of travel thereof devices having a greater responsiveness to eddy current effect than the genuine and to pass the genuine, and the other gap being differentially adjusted to pass devices having less responsiveness to eddy current effect than the genuine and to deflect the genuine, certain of said gaps being adjusted to be saturated at relatively low voltage in the line to render the field immune to line voltage variations, and an outlet portion in the chute at each gap for the discharge of spurious devices.

16. An apparatus of the character described comprising a chute having a passage therethrough, fluctuating current electromagnetic means including pairs of separated core portions forming vertically aligned gaps receiving said chute, said gaps being arranged eccentrically relative to coins or devices dropping through said passage, the core portions of the upper gap being adjusted to create a fluctuating magnetic field of a strength to deflect devices of greater responsiveness than the genuine and to pass the genuine and those of lesser responsiveness, and the core portions of the lower gap being adjusted to create a field strength sufficient to deflect the genuine device and pass the others, and outlet portions at each gap for the passage of the deflected devices.

17. An apparatus of the character described comprising a chute, electromagnetic means associated therewith and including core gaps at different elevations, the upper gap being adjusted to deflect and discharge spurious devices of greater responsiveness to eddy current effect than the genuine, and the lower gap being adjusted to deflect and discharge the genuine, lateral outlet portions for the deflected devices, and means associated with the lower lateral outlet portion for preventing passage of relatively thin spurious devices to the destination of the genuine device.

18. An apparatus of the character described comprising a pair of panels having a discharge passage therebetween, one panel having an opening therein, and means for deflecting outwardly through said opening devices passing through said passage, said means including a lower portion inclined outwardly over the lower edge of said opening and an oppositely inclined upper portion extending through an opening in the other panel.

19. An apparatus of the character described comprising a vertical chute, electromagnetic means including separated core portions forming a fluctuating magnetic gap at the lower portion of said chute, and a portion disposed below said gap having an inclined guiding edge and an apex, said gap and said apex being disposed substantially at opposite sides of the center of the coin or device when in operative relation to said gap, whereby to support the device on the inclined edge to allow the eddy current effect to force the device over the apex.

20. An apparatus of the character described comprising a chute, and a fluctuating current electromagnetic means including a core having separated portions forming a gap receiving said chute, said gap being located in offset relation to the center of the chute and producing a fluctuating magnetic field of an intensity to lift certain devices and deflect the same edgewise laterally out of the path of travel, and means constituting an outlet in the chute and providing a bearing at the opposite side of the center of the chute contiguous to the gap for supporting the device as the same is deflected.

21. An apparatus of the character described comprising an alternating current magnet having opposing core portions forming a gap, a vertical chute in said gap, said gap being offset relative to the vertical center line of the chute, and an outlet at the opposite side of said center line, said gap having a field intensity such as to bodily lift certain devices passing into the field and deflect the same edgewise laterally through said outlet.

22. An apparatus of the character described comprising a vertical chute and an alternating current electromagnet having opposing core portions at opposite sides of and in offset relation to the center of the chute and forming a gap, and an outlet at the opposite side of said center adjacent to said gap, said core portions producing a fluctuating magnetic flux such as to deflect certain devices edgewise laterally through said outlet, and to allow the passage of other devices therethrough, said core portions being magnetically saturated for low line voltage to render the same immune to voltage fluctuations.

23. An apparatus of the character described comprising fluctuating current electromagnetic means including sets of opposing core portions forming magnetic gaps at different elevations, and straight through and deflecting passage portions for said gaps, certain of said passage portions leading to the second gap.

24. An apparatus of the character described comprising a vertical chute for coins, tokens or like devices, and alternating current electromagnetic means including vertically aligned sets of opposing core portions forming magnetic gaps associated with said chute, said upper gap when energized having a field intensity sufficient to prevent passage to the lower gap of devices of greater responsiveness to eddy current effect than the genuine devices while allowing passage of the genuine and devices of less responsiveness to the lower gap, and said lower gap when energized having a field intensity sufficient to deflect the genuine devices without affecting devices of less responsiveness to eddy current effect, said lower gap being disposed to deflect said genuine devices edgewise laterally from the vertical path of travel of the devices.

25. The hereindescribed method of distinguishing between genuine and spurious coins, tokens or like devices which consists in causing the devices to pass into an alternating magnetic field acting upon opposite sides of the devices and having an intensity sufficient to prevent passage therethrough of devices of greater responsiveness to eddy current effect than the genuine and to allow the genuine and devices of lesser responsiveness to pass therethrough, and subjecting the devices passing the first field to a second alternating magnetic field acting upon opposite sides of the devices and in offset relation thereto and having an intensity sufficient to deflect the genuine devices edgewise without affecting the devices of lesser responsiveness to eddy current effect.

FAIRFIELD W. HOBAN.